(12) United States Patent
Karaoguz et al.

(10) Patent No.: US 8,400,568 B2
(45) Date of Patent: Mar. 19, 2013

(54) MULTIPLE DEVICE ACCESS WINDOWING DISPLAY

(75) Inventors: Jeyhan Karaoguz, Irvine, CA (US); James D. Bennett, San Clemente, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 968 days.

(21) Appl. No.: 10/885,404

(22) Filed: Jul. 6, 2004

(65) Prior Publication Data

US 2005/0066068 A1    Mar. 24, 2005

Related U.S. Application Data

(60) Provisional application No. 60/504,752, filed on Sep. 22, 2003.

(51) Int. Cl.
*H04N 5/445* (2006.01)

(52) U.S. Cl. ........................................ 348/563; 345/698

(58) Field of Classification Search ........... 348/563–570
See application file for complete search history.

(56) References Cited

U.S. PATENT DOCUMENTS

| | | | | |
|---|---|---|---|---|
| 4,855,813 A | * | 8/1989 | Russell et al. ................ | 348/559 |
| 5,287,188 A | * | 2/1994 | Saeger et al. ................ | 348/565 |
| 5,471,577 A | * | 11/1995 | Lightbody et al. ............ | 715/837 |
| 5,532,714 A | * | 7/1996 | Knapp et al. .................. | 345/634 |
| 5,794,116 A | * | 8/1998 | Matsuda et al. ............... | 725/114 |
| 5,801,785 A | * | 9/1998 | Crump et al. ................. | 348/563 |
| 6,046,777 A | * | 4/2000 | Patton et al. .................. | 348/565 |
| 6,141,003 A | * | 10/2000 | Chor et al. .................... | 715/719 |
| 6,864,921 B2 | * | 3/2005 | Kaneda et al. ................ | 348/383 |
| 2002/0005900 A1 | * | 1/2002 | Hudson ......................... | 348/159 |
| 2002/0154700 A1 | | 10/2002 | Tardif ..................... | 375/240.25 |

* cited by examiner

*Primary Examiner* — Kevin M Nguyen
*Assistant Examiner* — Cory Almeida
(74) *Attorney, Agent, or Firm* — Brinks Hofer Gilson & Llone

(57) ABSTRACT

A system and method for providing access to a video display for multiple devices. Various aspects of the present invention may comprise receiving a first display driver signal through a first display driver interface and a second display driver signal through a second display driver interface. A first module (e.g., a window multiplexer module) may process the first and second display driver signals to form respective first and second video windows in a composite display. For example, the first module may transform and translate video information to fit a window. The first module may, for example, generate an output video signal comprising information of the first window and information of the second window. Such a signal may, for example, be utilized to drive an output display showing the first and second windows. Various aspects may also provide method steps and apparatus for controlling features of the displayed windows.

38 Claims, 4 Drawing Sheets

MULTIPLE DEVICE ACCESS WINDOWING DISPLAY

CROSS-REFERENCE TO RELATED APPLICATIONS/INCORPORATION BY REFERENCE

This patent application is related to and claims priority from provisional patent application Ser. No. 60/504,752 filed Sep. 22, 2003, and titled "MULTIPLE DEVICE ACCESS WINDOWING DISPLAY," the contents of which are hereby incorporated herein by reference in their entirety. This patent application is related to U.S. patent application Ser. No. 10/874,680, entitled "O/S APPLICATION BASED MULTIPLE DEVICE ACCESS WINDOWING DISPLAY".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, video resources and their associated users may generally freely enter and leave the network. In various scenarios, demand for video output display services may exceed the supply for such services.

For example, a user of a handheld computing device may enter a room and desire to utilize a video display resource to view email information. Another user may, for example, desire to utilize the video display resource to display motion picture video information from a DVD player. Still another user may, for example, desire to utilize the video display resource to view a presentation that the user is developing on a laptop computing system. In general, a plurality of users in such a dynamic network environment may desire to view respective information (e.g., textual information, graphical information, static pictorial information, and motion picture information). In various scenarios, for example, the plurality of users may have to compete for limited video output resources.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing access to a video display for multiple devices. Various aspects of the present invention may comprise receiving a first display driver signal through a first display driver interface and a second display driver signal through a second display driver interface. The first and second display driver signals may correspond to respective first and second video images. The first and second display driver signals may, for example, comprise any of a variety of display driver signal types (e.g., composite or component video signals).

A first module (e.g., a window multiplexer module) may process the first and second display driver signals to form respective first and second video windows in a composite display. The first video window may correspond to the first video image, and the second video window may correspond to the second video image. For example, the first module (or sub-module(s) thereof) may determine respective video information from the first and second display driver signals.

The first module may, for example, transform the video information corresponding to the first video image into video information of the first window. The first module may, for example, transform the video information corresponding to the second video image into video information of the second window. Video information of the first and second windows may also, for example, comprise graphics information.

The first module may, for example, generate an output video signal comprising information of the first window and information of the second window. For example, the first module may combine (or multiplex) information of the first window and information of the second window into information of a composite display image. Such information may be converted into an output display driver signal. The output display driver signal may then be utilized to drive one or more display devices to present the first and second windows on the display device(s). Though generally described using two-window examples, various aspects of the present invention are generally extendible to n-window scenarios.

Various aspects of the present invention also may provide for automatic or manual control of various features of the first and second windows. For example, a window control module may interface with a user or a system component to determine various features of the first and second windows.

These and other advantages, aspects and novel features of the present invention, as well as details of illustrative aspects thereof, will be more fully understood from the following description and drawings.

DETAILED DESCRIPTION OF THE INVENTION

Figure 1:
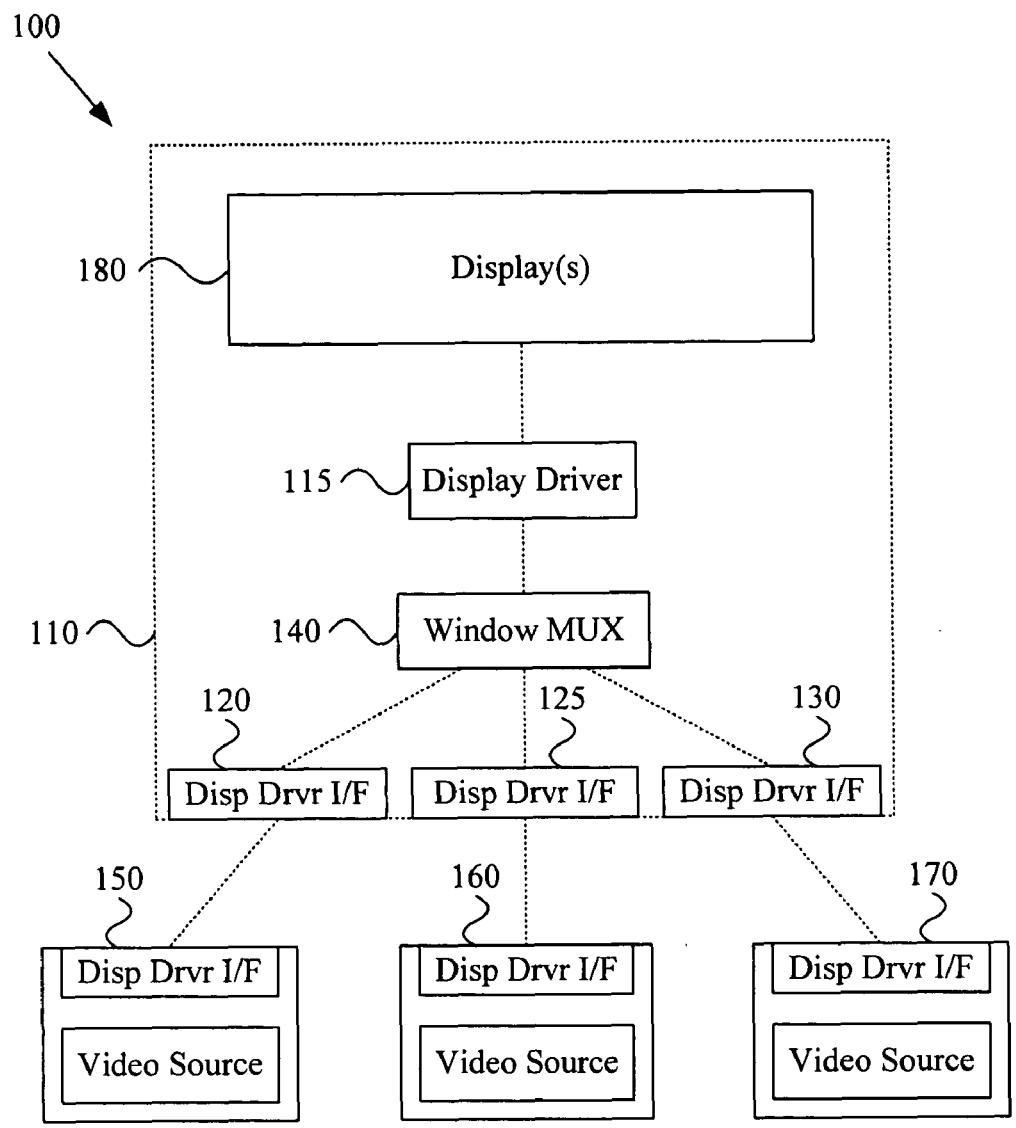
FIG. 1 is a diagram showing an exemplary system comprising a multiple device access windowing display, in accordance with various aspects of the present invention.

FIG. 1 is a diagram showing an exemplary system 100 comprising an exemplary multiple device access windowing display, in accordance with various aspects of the present invention. The exemplary system 100 may comprise an exemplary display system 110, first video source 150, second video source 160 and third video source 170.

The exemplary display system 110 may, for example, comprise a first display driver interface 120, second display driver interface 125 and third display driver interface 130. The display system 110 may, for example, comprise a first module 140 (e.g., a window multiplexer module 140) and an output display driver 115. The exemplary display system 110 may also, for example, comprise one or more video displays 180. Note however, that the various components of the exemplary display system 110 need not be grouped as a single physical entity or in any particular physical arrangement.

The first display driver interface 120 may, for example, be communicatively coupled to the first video source 150. The first video source 150 may, for example, comprise an internal video source coupled to a display driver interface. The display driver interface of the first video source 150 may, for example, communicate a first video display driver signal to the first display driver interface 120 of the display system 110. The first video display driver signal may correspond to a first video image (static or dynamic). For example, the display driver interface of the first video source 150 may comprise output display driver circuitry of a VCR, DVD player, TV receiver, laser disk player, computer, or computer graphics card. Additional exemplary characteristics regarding the first video source 150 will be provided in the following discussion of the exemplary system 200 of FIG. 2.

The first video display driver signal may, for example, comprise any of a large number of standard and proprietary video display driver signal types. For example and without limitation, the first video display driver signal may comprise a composite video signal or a component video signal. For example, the first video display driver signal may comprise a R-G-B signal, a Y-U-V or Y R-Y B-Y signal, a Y-I-Q signal, a Y-C or S-Video signal, a Y-Cr-Cb signal, a Y-Cd1-Cd2 signal, etc. Accordingly, the scope of various aspects of the present invention should not be limited by characteristics of a particular display driver signal type.

The communication interface between the first display driver interface 120 of the display system 110 and the display driver interface of the first video source 150 may comprise any of a variety of communication media. For example, the interface may comprise a wired or wireless RF coupling. Also for example, the interface may comprise a tethered optical or non-tethered optical coupling. Accordingly, the scope of various aspects of the present invention should not be limited by characteristics of a particular communication media over which the first video display driver signal is communicated between the first video source 150 and the first display driver interface 120.

The first video display driver signal communicated between the first video source 150 and the first display driver interface 120 may be independent of processing occurring in the display system 110. For example, the first video source 150 may output the same video display driver signal no matter what device is receiving the signal or what processing the receiving device may be performing on the signal. The first video source 150 may, for example, communicate with the display system 110 as the first video source 150 would communicate with any standard display.

The exemplary display system 110 may comprise a second display driver interface 125. The second display driver interface 125 may, for example, comprise any of the exemplary characteristics discussed previously with regard to the first display driver interface 120. It should be emphasized, however, that the second display driver interface 125 need not be identical to the first display driver interface 120. For example and without limitation, the first display driver interface 120 may comprise a composite video input, while the second display driver interface 125 may comprise a component video input.

Similarly, the second video source 160 may, for example, comprise any of the exemplary characteristics discussed previously with regard to the first video source 150 discussed previously. Also, the communication link between the second display driver interface 125 and the second video source 160 may, for example, comprise any of the exemplary characteristics discussed previously with regard to the communication link between the first display driver interface 120 and the first video source 150. Note, however, that the second video source 160 and communication link between the second video source 160 and the second display driver interface 125 need not exhibit the same characteristics as the first video source 150 and communication link between the first video source 150 and the first display driver interface 120.

The exemplary display system 110 may comprise a third display driver interface 130. The third display driver interface 130 may, for example, comprise any of the exemplary characteristics discussed previously with regard to the first display driver interface 120. It should be emphasized, however, that the third display driver interface 130 need not be identical to the first display driver interface 120. For example and without limitation, the first display driver interface 120 may comprise a composite video input, while the third display driver interface 130 may comprise a component video input.

Similarly, the third video source 170 may, for example, comprise any of the exemplary characteristics discussed previously with regard to the first video source 150 discussed previously. Also, the communication link between the third display driver interface 130 and the third video source 170 may, for example, comprise any of the exemplary characteristics discussed previously with regard to the communication link between the first display driver interface 120 and the first video source 150 discussed previously. Note, however, that the third video source 170 and communication link between the third video source 170 and the third display driver interface 130 need not exhibit the same characteristics as the first video source 150 and communication link between the first video source 150 and the first display driver interface 120.

The display system 110 may comprise a first module 140 (e.g., a window multiplexer module) that generates a video signal comprising information received from a plurality of display driver interfaces. For example and without limitation, the window multiplexer module 140 may receive a first video display driver signal from the first display driver interface 120 that is representative of a first video image. Also for example, the window multiplexer module 140 may receive a second video display driver signal from the second display driver interface 125 that is representative of a second video image.

Additionally, for example, the window multiplexer module 140 may receive further video driver signals from one or more other video sources (e.g., a third video display driver signal from the third display driver interface 130, originating from the third video source 170). The following discussion will generally discuss a two-window video display scenario. However, it should be understood that various two-window aspects discussed herein are readily extendible to three-window and n-window video display scenarios.

Note that the following discussion will generally utilize the phrase "video image" to mean static or dynamic video image. That is, a "video image" may comprise a moving picture, static image, frame of a moving picture, paused moving picture, scrolling document view, etc.

The window multiplexer module 140 may generate information of a first display window that corresponds to the first video image. For example, the window multiplexer module 140 may comprise a first sub-module (e.g., a first window generating sub-module) that generates such information. The window multiplexer module 140 may, for example, generate such information in the analog or digital domain. For example, the window multiplexer module 140 may transform information of the first video image to reflect an image of particular spatial dimensions (e.g., by sub-sampling or interpolating). For example, the window multiplexer module 140 may fit information of the first video image to the spatial dimensions of the first display window.

The window multiplexer module 140 may generate information of a second display window that corresponds to the second video image. For example, the window multiplexer module 140 may comprise a second sub-module (e.g., a second window generating sub-module) that generates such information. The window multiplexer module 140 may, for example, generate such information in the analog or digital domain. For example, the window multiplexer module 140 may transform information of the second video image to reflect an image of particular spatial dimensions (e.g., by sub-sampling or interpolating). For example, the window multiplexer module 140 may fit information of the second video image to the spatial dimensions of the second display window.

Additionally, for example, the window multiplexer module 140 may similarly generate information of a third display window that corresponds to the third video image and/or an nth display window that corresponds to an nth video image.

The dimensions of the first and second (or n) display windows may, for example, be generated automatically (e.g., according to default window dimension settings) or may be controlled by a user via a display control interface. Aspects of an exemplary display control interface will be discussed later in the discussion of the exemplary system 200 shown in FIG. 2.

The window multiplexer module 140 may generate a video signal comprising information of the first display window and information of the second display window (and additional windows if necessary). For example, the window multiplexer module 140 may comprise a third sub-module to perform such signal generation. Such signal generation may, for example, comprise multiplexing signals and/or information related to the first and second display windows. The video signal may generally, for example, correspond to a video display image comprising at least a portion of the first display window (and/or related graphics) and at least a portion of the second display window (and/or related graphics).

The window multiplexer module 140 may generally generate a video signal comprising information related to the first display window and information related to the second display window. Accordingly, the scope of various aspects of the present invention should not be limited by characteristics of particular signal or information processing (e.g., signal/information transforming, combining or generating).

The video system 110 may, for example, comprise a graphics generator communicatively coupled to the window multiplexer module 140. For example, in an exemplary scenario where the second display window is represented by an icon, the video signal generated by the window multiplexer module 140 may comprise graphical information of the icon instead of, or in addition to, information of the second display window. Also, in an exemplary scenario where the window multiplexer module 140 receives information related to a third video (or nth video), the video signal may comprise information of a third display window (or nth display window).

The window multiplexer module 140 may communicate the generated video signal to the output display driver 115. The output display driver 115 may, for example, comprise any of a variety of display driving circuitry. For example, the output display driver 115 may comprise component video driving circuitry or composite video driving circuitry. The output display driver 115 may, for example, comprise one or more display buffers and associated signal processing circuitry. The output display driver 115 may, for example, comprise circuitry characteristic of computer graphics card circuitry. Accordingly, the scope of various aspects of the present invention should not be limited by characteristics of particular display driving circuitry.

As mentioned previously, the exemplary video system 110 may comprise one or more video display devices 180. Note, however, that the scope of various aspects of the present invention should not be limited by the existence of one or more video display devices 180 or by whether the video display device(s) 180 and other components of the exemplary system 110 are enclosed in the same physical housing. The output display driver 115 may, for example, communicate display driving signals corresponding to the video signal generated by the window multiplexer module 140 to the video display device(s) 180 using any of a variety of media and protocols, such as, for example, those discussed previously with regard to the display driver interfaces of the video sources 150, 160, 170. Accordingly, the scope of various aspects of the present invention should not be limited by characteristics of a particular interface between the output display driver 115 and a video display.

The video display device(s) 180 may then generate a video image corresponding to the video signal generated by the window multiplexer module 140. Such a video image may, for example, comprise a video display image comprising a plurality of windows (e.g., a first window corresponding to the first video image and a second window corresponding to the second video image).

Figure 2:
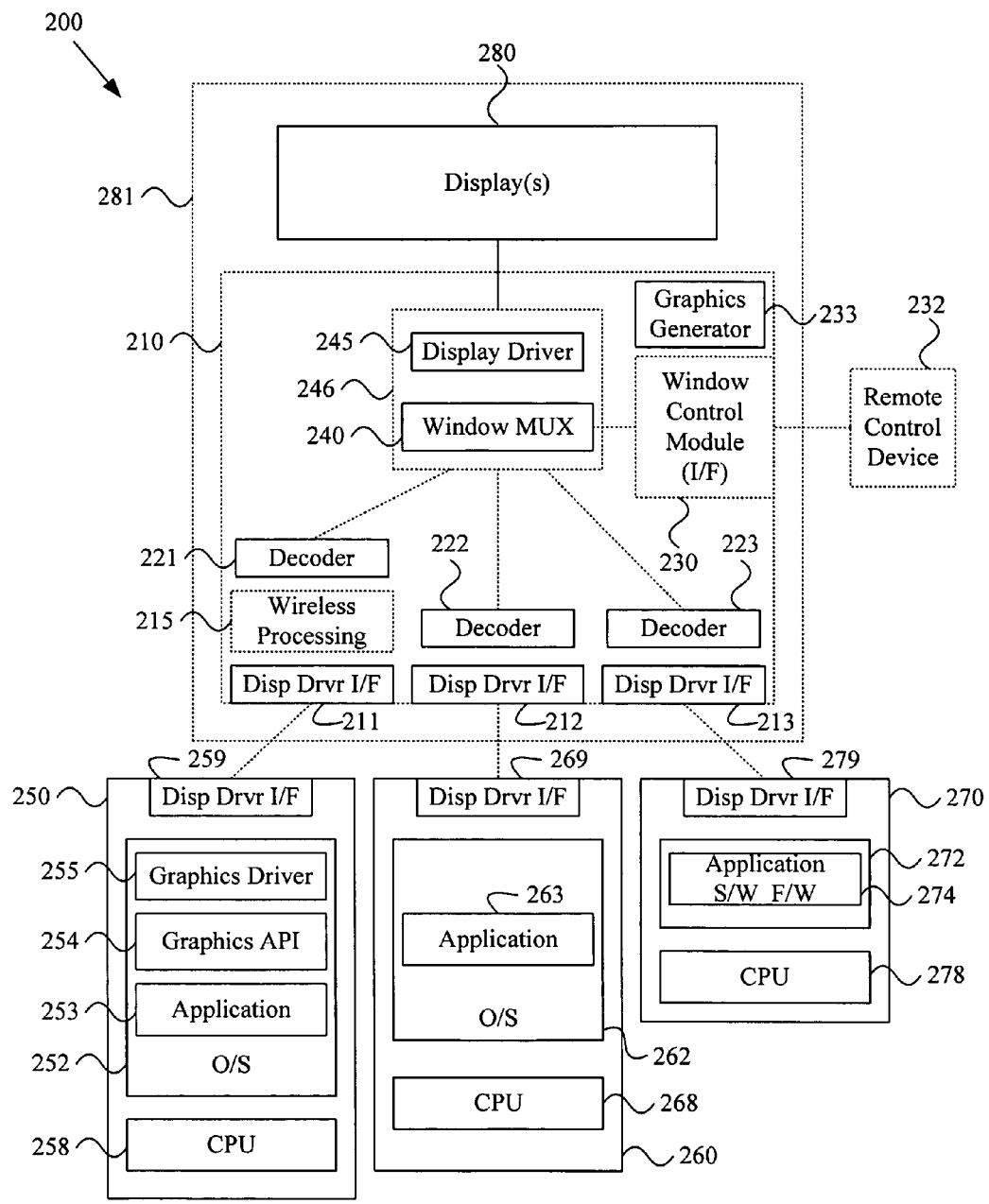
FIG. 2 is a diagram showing an exemplary system comprising a multiple device access windowing display, in accordance with various aspects of the present invention.

FIG. 2 is a diagram showing an exemplary system 200 comprising an exemplary multiple device access windowing display, in accordance with various aspects of the present invention. The exemplary system 200 illustrates various aspects of the present invention not illustrated in the exemplary system 100 shown in FIG. 1, and also provides further examples of various aspects illustrated in the exemplary system 100 shown in FIG. 1 and discussed previously. Accordingly, the scope of various aspects of the present invention should not be limited by characteristics of particular systems or components illustrated in the exemplary system 200 and discussed below.

The exemplary system 200 may comprise an exemplary display system 210, first video source 250, second video source 260 and third video source 270. The exemplary system 200 may also comprise a video display device 280 (or multiple video display devices). Note that the video display device 280 and exemplary display system 210 may, for example, be separate or may be combined into a single unit, as illustrated by box 281.

The exemplary display system 210 may, for example, comprise a first display driver interface 211, second display driver interface 212 and third display driver interface 213. The display system 210 may, for example, comprise a first module 240 (e.g., a window multiplexer module 240) and an output display driver 245. The first module 240 and the output display driver 245 may, for example, be separate or integrated into a single module, as illustrated by box 246. Note however, that the various components of the exemplary display system 210 need not be grouped as a single physical entity or in any particular physical arrangement.

The first display driver interface 211 may, for example, be communicatively coupled to the first video source 250. The first video source 250 may, for example, comprise an internal video source coupled to a display driver interface 259. The internal video source may, for example, comprise a central processing unit ("CPU") 258 operating according to hardware and software or firmware instructions. For example, the internal video source of the first video source 250 may comprise an operating system ("O/S") 252 which integrates an application 253, graphics application program interface ("API") 254, and graphics driver 255. For example and without limitation, the CPU 258 may execute the application 253, which in turn invokes various graphics API 254 routines, which in turn drive functionality in the graphics driver 255. The graphics driver 255 may then communicate video information with the display driver interface 259 of the first video source 250.

The display driver interface 259 of the first video source 250 may, for example, communicate a first video display driver signal to the first display driver interface 211 of the display system 210. The first video display driver signal may correspond to a first video image (static or dynamic). For example, the display driver interface 259 of the first video source 250 may comprise output display driver circuitry of a VCR, DVD player, TV receiver, laser disk player, computer, or computer graphics card.

The first video display driver signal may, for example, comprise any of a large number of standard and proprietary video display driver signal types. For example and without limitation, the first video display driver signal may comprise a composite video signal or a component video signal. For example, the first video display driver signal may comprise a R-G-B signal, a Y-U-V or Y R-Y B-Y signal, a Y-I-Q signal, a Y-C or S-Video signal, a Y-Cr-Cb signal, a Y-Cd1-Cd2 signal, etc. Accordingly, the scope of various aspects of the present invention should not be limited by characteristics of a particular display driver signal type.

The communication interface between the first display driver interface 211 of the display system 210 and the display driver interface 259 of the first video source 250 may comprise any of a variety of communication media. For example, the interface may comprise a wired or wireless RF coupling. Also for example, the interface may comprise a tethered optical or non-tethered optical coupling. Accordingly, the scope of various aspects of the present invention should not be limited by characteristics of a particular communication media over which the first video display driver signal is communicated between the first video source 250 and the first display driver interface 211 of the display system 210.

The first video display driver signal communicated between the first video source 250 and the first display driver interface 211 may be independent of processing occurring in the display system 210. For example, the first video source 250 may output the same video display driver signal no matter what device is receiving the signal or what processing the receiving device may be performing on the signal. The first video source 250 may, for example, communicate with the display system 210 as the first video source 250 would communicate with any standard display.

The exemplary display system 210 may comprise a second display driver interface 212. The second display driver interface 212 may, for example, comprise any of the exemplary characteristics discussed previously with regard to the first display driver interface 211. It should be emphasized, however, that the second display driver interface 212 need not be identical to the first display driver interface 211. For example and without limitation, the first display driver interface 211 may comprise a composite video input, while the second display driver interface 212 may comprise a component video input. Similarly, the second video source 260 may, for example, comprise any of the exemplary characteristics discussed previously with regard to the first video source 250 discussed previously.

As illustrated in FIG. 2, the second display driver interface 212 may, for example, be communicatively coupled to the second video source 260. The second video source 260 may, for example, comprise an internal video source coupled to a display driver interface 269. The internal video source of the second video source 260 may, for example, comprise a central processing unit ("CPU") 268 operating according to hardware and software or firmware instructions. For example, the internal video source of the second video source 260 may comprise an operating system ("O/S") 262 on which an application 263 operates. For example and without limitation, the CPU 268 may execute the application 263, which in turn may comprise and/or utilize various graphics routines. The graphics routines of the application 263 may then communicate information with the display driver interface 269 of the second video source 260.

The communication link between the second display driver interface 212 and the second video source 260 may, for example, comprise any of the exemplary characteristics discussed previously with regard to the communication link between the first display driver interface 211 and the first video source 250. Note, however, that the second video source 260 and communication link between the second video source 260 and the second display driver interface 212 need not exhibit the same characteristics as the first video source 250 and communication link between the first video source 250 and the first display driver interface 211.

The exemplary display system 210 may comprise a third display driver interface 213. The third display driver interface 213 may, for example, comprise any of the exemplary characteristics discussed previously with regard to the first and second display driver interfaces 211-212. It should be emphasized, however, that the third display driver interface 213 need not be identical to either of the first or second display driver interfaces 211-212. For example and without limitation, the first and second display driver interfaces 211-212 may comprise respective composite video inputs, while the third display driver interface 213 may comprise a component video input. Similarly, the third video source 270 may, for example, comprise any of the exemplary characteristics discussed previously with regard to the first and second video sources 250, 260 discussed previously.

As illustrated in FIG. 2, the third display driver interface 213 may, for example, be communicatively coupled to the third video source 270. The third video source 270 may, for example, comprise an internal video source coupled to a display driver interface 279. The internal video source of the third video source 270 may, for example, comprise a central processing unit ("CPU") 278 operating according to an embedded application 274 and minimal set of boot code instructions 272. For example and without limitation, the CPU 278 may execute the embedded boot code instructions 272 and application instructions 274, which in turn may generate video information. The CPU 278, executing such instructions 272, 274 may then communicate information with the display driver interface 279 of the third video source 270.

The communication link between the third display driver interface 213 and the third video source 270 may, for example, comprise any of the exemplary characteristics discussed previously with regard to the communication link between the first display driver interface 211 and the first video source 250 and between the second display driver interface 212 and the second video source 260. Note, however, that the third video source 270 and communication link between the third video source 270 and the third display driver interface 213 need not exhibit the same characteristics as the first video source 250, second video source 260 and respective communication links with the first display driver interface 211 and the second display driver interface 212.

As mentioned previously, the communication interface between the first display driver interface 211 of the display system 210 and the first display driver interface 259 of the first video source 250 may comprise a wireless communication link (e.g., an RF or non-tethered optical communication link). The second 212 and third 213 display driver interfaces may also comprise such a link. The exemplary display system 210 is illustrated in FIG. 2 with a wireless processing module 215 communicatively coupled to the first display driver interface 211. The wireless processing module 215 may, for example, perform wireless communication link processing in the event that a display driver communication link with the first display driver interface 211 is based on wireless technology.

The exemplary display system 210 may, for example, comprise respective decoding modules 221-223 corresponding to each of the display driver interfaces 211-213. For example, the decoding modules 221-223 may provide general data detecting, decoding and processing functionality associated with respective display driver signals received by the respective display driver interfaces 211-213. Note, however, that the scope of various aspects of the present invention should not be limited by characteristics of particular signal decoding functionality or apparatus.

The display system 210 may comprise a first module 240 (e.g., a window multiplexer module) that generates a video signal comprising information received from a plurality of display driver interfaces. For example and without limitation, the window multiplexer module 240 may receive a first video display driver signal from the first display driver interface 211 (and associated signal processing modules) that is representative of a first video image. Also for example, the window multiplexer module 240 may receive a second video display driver signal from the second display driver interface 212 (and associated signal processing modules) that is representative of a second video image. Additionally, for example, the window multiplexer module 240 may receive a third video display driver signal from the third display driver interface 213 (and associated signal processing modules) that is representative of a third video image.

Additionally, for example, the window multiplexer module 240 may receive further video driver signals from one or more other video sources (e.g., an nth video display driver signal from an nth display driver interface, originating from an nth video source). The following discussion will generally discuss a three-window video display scenario. However, it should be understood that various three-window aspects discussed herein are readily extendible to n-window video display scenarios.

The window multiplexer module 240 may generate information of a first display window that corresponds to the first video image from the first video source 250. For example, the window multiplexer module 240 may comprise a first sub-module (e.g., a first window generating sub-module) that generates such information. The window multiplexer module 240 may, for example, generate such information in the analog or digital domain. For example, the window multiplexer module 240 may transform information of the first video image to reflect an image of particular spatial dimensions (e.g., by sub-sampling or interpolating). For example, the window multiplexer module 240 may fit information of the first video image to the spatial dimensions of the first display window.

The window multiplexer module 240 may generate information of a second display window that corresponds to the second video image from the second video source 260. For example, the window multiplexer module 240 may comprise a second sub-module (e.g., a second window generating sub-module) that generates such information. The window multiplexer module 240 may, for example, generate such information in the analog or digital domain. For example, the window multiplexer module 240 may transform information of the second video image to reflect an image of particular spatial dimensions (e.g., by sub-sampling or interpolating). For example, the window multiplexer module 240 may fit information of the second video image to the spatial dimensions of the second display window.

The window multiplexer module 240 may generate information of a third display window that corresponds to the third video image from the third video source 270. For example, the window multiplexer module 240 may comprise a third sub-module (e.g., a third window generating sub-module) that generates such information. The window multiplexer module 240 may, for example, generate such information in the analog or digital domain. For example, the window multiplexer module 240 may transform information of the third video image to reflect an image of particular spatial dimensions (e.g., by sub-sampling or interpolating). For example, the window multiplexer module 240 may fit information of the third video image to the spatial dimensions of the third display window. Additionally, for example, the window multiplexer module 240 may similarly generate information of an nth display window that corresponds to an nth video image.

The dimensions of the first, second and third (or nth) display windows may, for example, be generated automatically (e.g., according to default window dimension settings) or may be controlled by a user via a display control interface. The exemplary display system 210 may comprise a control module 230 (e.g., a window control module) that receives window control information. The window control module 230 may provide such window control information to the window multiplexer module 240 or other module of the exemplary system 210. Such window control information may, for example, comprise information of window spatial characteristics. Such spatial characteristics may, for example, comprise window dimension information and window placement information. The window control information may also, for example, comprise information related to maximizing and minimizing windows, window layering, and reducing windows to icons and vice versa.

The exemplary system 200 illustrates a remote control device 232 that is communicatively coupled to the window control module 230. A user may, for example, utilize such a remote control device 232, or alternatively a control feature mounted to a component of the display system 210, to communicate window control information to the display system 210. In an exemplary scenario, a user may enter a window sizing command with the remote control device 232, which the window control module 230 receives and processes. The window control module 230 may then communicate information of the exemplary window sizing command to the window multiplexer module 240.

In general, the window control module 230 may receive a window control signal and determine spatial characteristics of a window based on such a window control signal. Accordingly, the scope of various aspects of the present invention should not be limited by characteristics of a particular window control processing method, a window control signal interface, or a particular apparatus utilized by a user or system to generate and communicate a window control signal.

The window multiplexer module 240 may generate a video signal comprising information of the first display window, information of the second display window and information of the third display window (and additional windows if necessary). For example, the window multiplexer module 240 may comprise a fourth sub-module to perform such signal generation. Such signal generation may, for example, comprise multiplexing signals and/or information related to the first, second and third display windows. The video signal may generally, for example, correspond to a video display image comprising at least a portion of the first display window (and/or related graphics), at least a portion of the second display window (and/or related graphics), and at least a portion of the third display window (and/or related graphics).

The window multiplexer module 240 may generally generate a video signal comprising information related to the first, second and third display windows. Accordingly, the scope of various aspects of the present invention should not be limited by characteristics of particular signal or information processing (e.g., signal/information transforming, combining or generating).

The video system 210 may, for example, comprise a graphics generator 233 communicatively coupled to the window multiplexer module 240. For example, in an exemplary scenario where the second window is represented by an icon, the graphics generator 233 may communicate icon graphic information to the window multiplexer module 240. The window multiplexer module 240 may then, for example, incorporate such icon graphic information into the video signal output from the window multiplexer module 240.

Also for example, the graphics generator 233 may also generate other graphical components related to the windows, including but not limited to window framing graphics, window control graphics, and cursor graphics. The graphics generator 233 may communicate such graphical information to the window multiplexer module 240, which may then incorporate such graphical information into the video signal output from the window multiplexer module 240. In general, the graphics generator 233 may generate graphical information corresponding to a variety of video graphics that the window multiplexer module 240 may incorporate into (or overlay on) the video signal output from the window multiplexer module 240. Accordingly, the scope of various aspects of the present invention should not be limited by characteristics of particular graphics or particular apparatus or methods for generating and utilizing such graphics.

The window multiplexer module 240 may communicate the generated video signal to the output display driver 245. The output display driver 245 may, for example, comprise any of a variety of display driving circuitry. For example, the output display driver 245 may comprise component video driving circuitry or composite video driving circuitry. The output display driver 245 may, for example, comprise one or more display buffers and associated video signal processing circuitry. The output display driver 245 may, for example, comprise circuitry characteristic of computer graphics card circuitry. Accordingly, the scope of various aspects of the present invention should not be limited by characteristics of particular display driving circuitry.

As mentioned previously, the exemplary video system 210 may comprise one or more video display devices 280. Note, however, that the scope of various aspects of the present invention should not be limited by the existence of one or more video display devices 280 or by whether the video display device(s) 280 and other components of the exemplary system 210 are enclosed in the same physical housing. The video display device(s) 280 may comprise a variety of video display characteristics. For example and without limitation, the video display device(s) 280 may comprise multiple screens or a single screen, an LCD display, a plasma display or a CRT.

The output display driver 245 may, for example, communicate one or more display driving signals corresponding to the video signal generated by the window multiplexer module 240 to the video display device(s) 280 using any of a variety of media and protocols, such as, for example, those discussed previously with regard to the display driver interfaces of the video sources 150, 160, 170 of the system 100 illustrated in FIG. 1. Accordingly, the scope of various aspects of the present invention should not be limited by characteristics of a particular interface between the output display driver 245 and a video display.

The video display device(s) 280 may receive the video signal from the output display driver 245 and generate a video image corresponding to the video signal generated by the window multiplexer module 240. Such a video image may, for example, comprise a video display image comprising a plurality of windows (e.g., a first window corresponding to the first video image from the first video source 250, a second window corresponding to the second video image from the second video source 260, and a third window corresponding to the third video image from the third video source 270).

Figure 3:
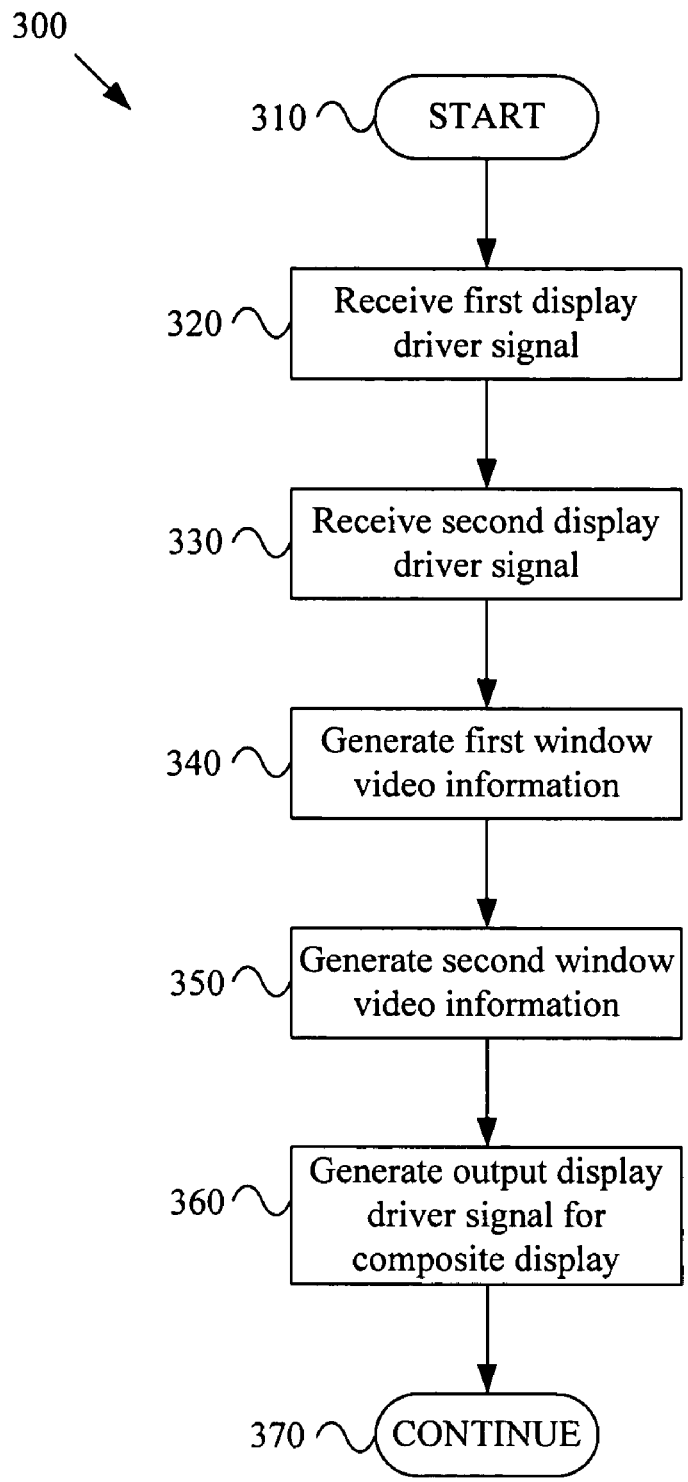
FIG. 3 is a flow diagram illustrating a method for providing a multiple device access windowing display, in accordance with various aspects of the present invention.

FIG. 3 is a flow diagram illustrating a method 300 for providing a multiple device access windowing display, in accordance with various aspects of the present invention. The method 300 begins at step 310. Various events and conditions may cause the method 300 to begin. For example, a user of a video display system or a video source system may request that the video display system display a video image from the video source system. Alternatively, for example, the video display system may be configured to automatically display a video image from a video image source under particular triggering circumstances. Generally, the method 300 may be initiated for a variety of reasons. Accordingly, the scope of various aspects of the present invention should not be limited by characteristics of particular initiating events or conditions.

The method 300, at step 320, may comprise receiving a first display driver signal from a first video source device, where the first display driver signal corresponds to a first video image (static or dynamic). For example and without limitation, the first display driver signal may originate from a first video source device comprising a VCR, DVD player, TV receiver, laser disk player, computer, or computer graphics card.

The first display driver signal may, for example, comprise any of a large number of standard and proprietary video display driver signals (e.g., as discussed previously with regard to the exemplary systems 100, 200 illustrated in FIGS. 1 and 2). For example and without limitation, the first display driver signal may comprise a composite video signal or a component video signal. For example, the first display driver signal may comprise a R-G-B signal, a Y-U-V or Y R-Y B-Y signal, a Y-I-Q signal, a Y-C or S-Video signal, a Y-Cr-Cb signal, a Y-Cd1-Cd2 signal, etc. Accordingly, the scope of various aspects of the present invention should not be limited by characteristics of a particular display driver signal.

Further, the first display driver signal may, for example, be received over any of a variety of communication media. For example and without limitation, such communication media may comprise wired or wireless RF media. Also for example, such communication media may comprise tethered optical or non-tethered optical communication media. Accordingly, the scope of various aspects of the present invention should not be limited by characteristics of a particular communication media over which the first display driver signal is communicated.

The first display driver signal received at step 320 may, for example, be independent of subsequent processing occurring in the exemplary method 300. For example, a video source of the first display driver signal may output the same display driver signal no matter what further processing the first display driver signal may be subjected to. In other words, the source of the first display driver signal may, for example, generate and communicate the first display driver signal without regard to characteristics of the receiver of such signal. For example, the source of the first display driver signal may generate the first display driver signal according to any predetermined video driver standard.

The method 300, at step 330, may comprise receiving a second display driver signal. Step 330 may, for example, comprise various aspects of step 320 discussed previously. It should be emphasized, however, that the second display driver signal need not be identical in type to the first display driver signal received at step 320. For example and without limitation, the first display driver signal may comprise a component video signal, while the second display driver signal may comprise a composite video signal.

Additionally, the communication link over which the second display driver signal may be received may, for example, comprise any of the exemplary characteristics discussed previously with regard to the first display driver signal. Note, however, that the communication link over which the second display driver signal is received at step 330 need not exhibit the same characteristics as the communication link over which the first display driver signal is received at step 320. Nor do respective sources of the second display driver signal and the first display driver signal necessarily exhibit the same characteristics.

Though not illustrated in the exemplary method 300, the method 300 may comprise receiving a third (or nth) display driver signal. The method 300 generally illustrates the receipt and processing of two display driver signals for the sake of clarity, however, various aspects of the present invention are readily extendible to receiving and processing one, two, three or more display driver signals. Accordingly, the scope of various aspects of the present invention should not be limited by characteristics of receiving and processing a particular number of display driver signals.

The method 300, at step 340, may comprise processing the first display driver signal to generate video information of a first display window corresponding to the first video. As mentioned previously, the first display driver signal corresponds to a first video image. Generally, the first display driver signal may comprise a signal for driving a display where the entire screen is dedicated to the first video image.

Step 340 may, for example, process the first display driver information to generate video information of a first display window in the analog or digital domain. For example, step 340 may comprise detecting video information in the first display driver signal (received at step 320) and transforming such video information to fit spatial characteristics of the first display window. For example, step 340 may comprise performing spatial transformation processing of the video information corresponding to the first display driver signal. Such spatial transformation processing may comprise, for example, image data sub-sampling or interpolating. Such spatial transformation processing may comprise, for example, image translation processing and/or processing image information using general or custom transformation matrix processing.

Also, for example, step 340 may comprise transforming the first display driver signal to a display driver signal corresponding to a first display window utilizing various analog video signal processing techniques. Such analog signal transformation may, for example, result in the display driver signal representing video image information corresponding to the first display window.

In general, step 340 may comprise processing the first display driver signal to generate video information of the first display window corresponding to the first video represented by the first display driver signal received at step 320. Accordingly, the scope of various aspects of the present invention should not be limited by characteristics of particular video signal or video data transformation processes.

The method 300, at step 350, may comprise processing the second display driver signal to generate video information of a second display window corresponding to the second video. As mentioned previously, the second display driver signal corresponds to a second video image. Generally, the second display driver signal may comprise a signal for driving a display where the entire screen is dedicated to the second video image. Step 350 may, for example, comprise various aspects of step 340 discussed previously. Note, however, that step 350 may perform processing different than step 340. For example, the second display driver signal may comprise a different type of video driver signal than the first display driver signal.

Step 350 may, for example, process the second display driver information to generate video information of a second display window in the analog or digital domain. For example, step 350 may comprise detecting video information in the second display driver signal (received at step 330) and transforming such information to fit spatial characteristics of the second display window. For example, step 350 may comprise performing spatial transformation processing of the video information corresponding to the second display driver signal. Such spatial transformation processing may comprise, for example, image data sub-sampling or interpolating. Such spatial transformation processing may comprise, for example, image translation processing and/or processing image information using general or custom transformation matrix processing.

Also, for example, step 350 may comprise transforming the second display driver signal to a display driver signal corresponding to a second display window utilizing various analog video signal processing techniques. Such analog signal transformation may, for example, result in the display driver signal representing video image information corresponding to the second display window.

In general, step 350 may comprise processing the second display driver signal to generate video information of a second display window corresponding to the second video represented by the second display driver signal received at step 330. Accordingly, the scope of various aspects of the present invention should not be limited by characteristics of particular video signal or video data transformation processes.

The dimensions of the first and second (or n) display windows in steps 340 and 350 may, for example, be generated automatically (e.g., according to default window dimension settings) or may be manually controlled by a user via a display control interface. Aspects of user control of various window characteristics will be discussed later in the discussion of the method 400 illustrated in FIG. 4.

The method 300, at step 360, may comprise generating an output display driver signal comprising at least a portion of the video information of the first display window and at least a portion of the video information of the second display window. For example, step 360 may comprise combining at least a portion of the first display window information generated at step 340 with at least a portion of the second display window information generated at step 350 into information of a display image comprising at least a portion of the first display window and at least a portion of the second display window. Step 360 may, for example, comprise placing display image information in a video buffer.

Step 360 may, for example, comprise multiplexing video information (or signals) in the digital domain or multiplexing various window signals in the analog domain. Accordingly, the scope of various aspects of the present invention should not be limited by characteristics of particular processing or multiplexing techniques that may be utilized to combine window images (information and/or signals) into a composite display image comprising aspects of the various window images.

Step 360 may, for example, further comprise incorporating graphics information into the output display driver signal. Such graphics information may, for example, comprise various graphics information related to the first and second display windows. Such graphics information may, for example, comprise window border information, cursor information, scroll bar information, menu information, icon information, etc. For example, in an exemplary scenario, the first and second display windows may be associated with respective icons, and step 360 may comprise incorporating information of the respective icons in addition to (or in place of) information of the first and second display windows in the output display driver signal. Step 360 may, for example, comprise incorporating graphics information, textual information, and other information into the output display driver signal. Accordingly, the scope of various aspects of the present invention should not be limited by characteristics of particular information (graphics or otherwise) additional to window video information that may be incorporated into the output display driver signal.

The method 300, at step 370, may comprise performing further processing. For example, step 370 may comprise providing the output display driver signal generated at step 360 to one or more display devices. Step 370 may, for example, further comprise repeating various steps of the method 300 until a user directs processing to change or halt.

Figure 4:
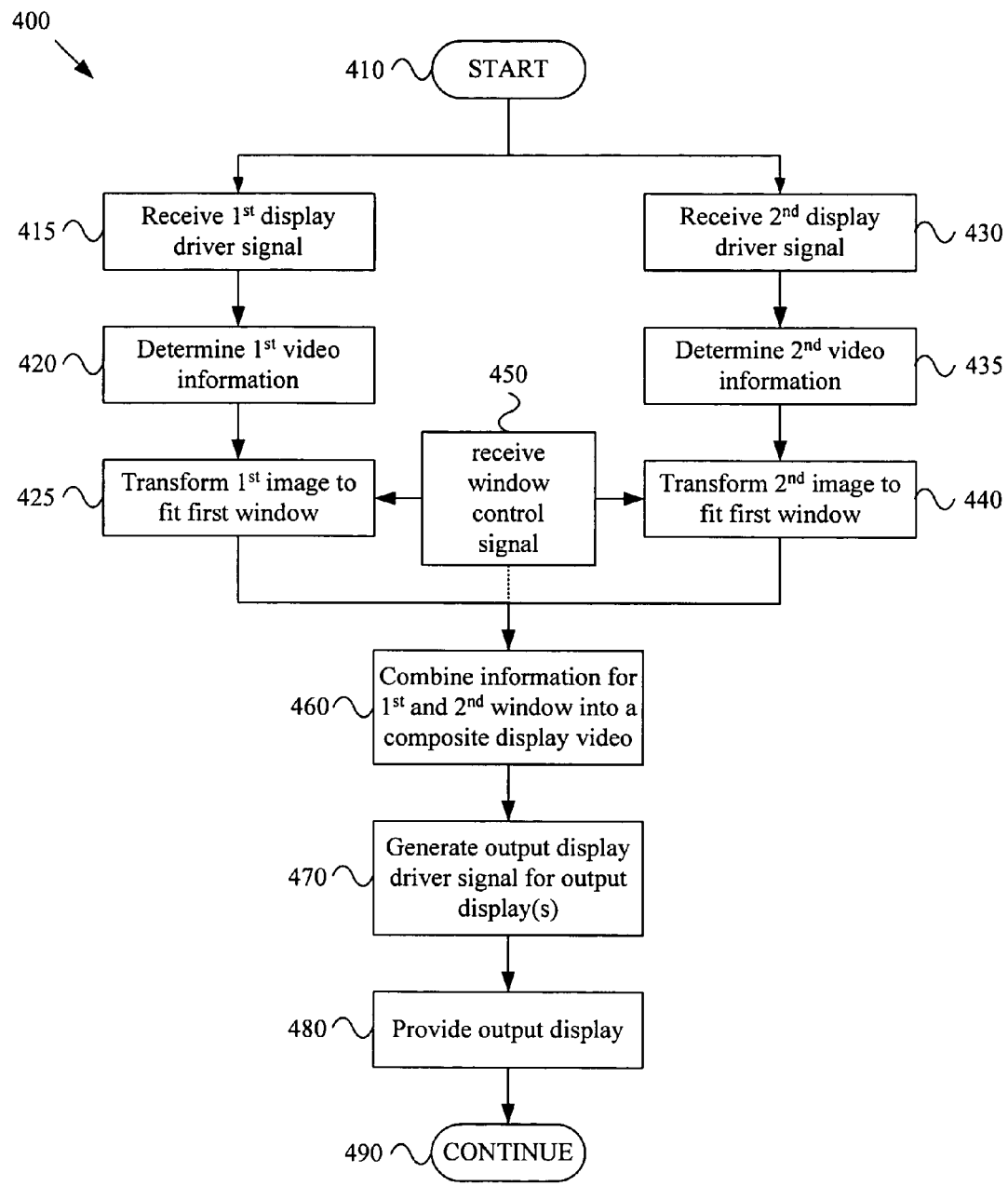
FIG. 4 is a flow diagram illustrating a method for providing a multiple device access windowing display, in accordance with various aspects of the present invention.

FIG. 4 is a flow diagram illustrating an exemplary method 400 for providing a multiple device access windowing display, in accordance with various aspects of the present invention. The exemplary method 400 illustrates various aspects of the present invention not illustrated in the exemplary method 300 shown in FIG. 3, and also provides further examples of various aspects illustrated in the exemplary method 300 shown in FIG. 3 and discussed previously. Accordingly, the scope of various aspects of the present invention should not be limited by characteristics of various method steps illustrated in the exemplary method 400 and discussed below.

The method 400 begins at step 410. Various events and conditions may cause the method 400 to begin. For example, a user of a video display system or a video source system may request that the video display system display a video image from the video source system. Alternatively, for example, the video display system may be configured to automatically display a video image from a video image source under particular triggering circumstances. Generally, the method 400 may be initiated for any of a variety of reasons. Accordingly, the scope of various aspects of the present invention should not be limited by characteristics of particular initiating events and conditions.

The method 400, at step 415, may comprise receiving a first display driver signal from a first video source device, where the first display driver signal corresponds to a first video image (static or dynamic). For example and without limitation, the first display driver signal may originate from a first video source device comprising a VCR, DVD player, TV receiver, laser disk player, computer, or computer graphics card.

Step 415 may, for example, share various aspects with step 320 of the method 300 illustrated in FIG. 3 and discussed previously. However, step 415 should by no means be limited to performing the same functionality as step 320.

The first display driver signal may, for example, comprise any of a large number of standard and proprietary video display driver signals (e.g., as discussed previously with regard to the exemplary systems 100, 200 illustrated in FIGS. 1 and 2, and the exemplary method 300 illustrated in FIG. 3). For example and without limitation, the first display driver signal may comprise a composite video signal or a component video signal. For example, the first display driver signal may comprise a R-G-B signal, a Y-U-V or Y R-Y B-Y signal, a Y-I-Q signal, a Y-C or S-Video signal, a Y-Cr-Cb signal, a Y-Cd1-Cd2 signal, etc. Accordingly, the scope of various aspects of the present invention should not be limited by characteristics of a particular display driver signal.

Further, the first display driver signal may, for example, be received over any of a variety of communication media. For example and without limitation, such communication media may comprise wired or wireless RF media. Also for example, such communication media may comprise tethered optical or non-tethered optical communication media. Accordingly, the scope of various aspects of the present invention should not be limited by characteristics of a particular communication media over which the first display driver signal is communicated.

The first display driver signal received at step 415 may, for example, be independent of subsequent processing occurring in the exemplary method 400. For example, a video source of the first display driver signal may output the same display driver signal no matter what further processing the first display driver signal may be subjected to. In other words, the source of the first display driver signal may, for example, generate and communicate the first display driver signal without regard to characteristics of the receiver of such signal. For example, the source of the first display driver signal may generate the first display driver signal according to any predetermined video driver standard.

The method 400, at step 430, may comprise receiving a second display driver signal. Step 430 may, for example, share various aspects with step 415 discussed previously and with step 330 of the method 300 illustrated in FIG. 3 and discussed previously. It should be emphasized, however, that the second display driver signal need not be identical in type to the first display driver signal received at step 415. For example and without limitation, the first display driver signal may comprise a component video signal, while the second display driver signal may comprise a composite video signal.

Additionally, the communication link over which the second display driver signal may be received may, for example, comprise any of the exemplary characteristics discussed previously with regard to the first display driver signal. Note, however, that the communication link over which the second display driver signal is received at step 430 need not exhibit the same characteristics as the communication link over which the first display driver signal is received at step 415. Nor do respective sources of the second display driver signal and the first display driver signal necessarily exhibit the same characteristics.

Though not illustrated in the exemplary method 400, the method 400 may comprise receiving a third (or nth) display driver signal. The method 400 generally illustrates the receipt and processing of two display driver signals for the sake of clarity, however, various aspects of the present invention are readily extendible to receiving and processing one, two, three or more display driver signals. Accordingly, the scope of various aspects of the present invention should not be limited by characteristics of receiving and processing a particular number of display driver signals.

The method 400, at step 420, may comprise processing the first display driver signal to generate (or determine) video information of the first video image. As mentioned previously, the first display driver signal corresponds to a first video image. Generally, the first display driver signal may, for example, comprise a signal for driving a display where the entire screen is dedicated to the first video image. Step 420 may, for example, comprise detecting digital (or analog) video information in the first display driver signal. Step 420 may generally comprise generating (or determining) video information in the first display driver signal corresponding to the first video image. Accordingly, the scope of various aspects of the present invention should not be limited by characteristics of particular data (or information) detection techniques or processing.

The method, at step 425, may comprise processing the first video image information determined at step 420 to generate video information of a first display window. For example, step 425 may comprise transforming the first video image information to fit spatial characteristics of the first display window. For example, step 425 may comprise performing spatial transformation processing of the first video image information. Such spatial transformation processing may comprise, for example, image data sub-sampling or interpolating. Such spatial transformation processing may comprise, for example, image translation processing and/or processing image information using general or custom transformation matrix processing.

In general, step 425 may comprise processing the first video image information to generate video information of a first display window corresponding to the first video image. Accordingly, the scope of various aspects of the present invention should not be limited by characteristics of particular video signal or video data transformation processes.

Steps 420 and 425 may, for example share various aspects with step 340 of the method 300 illustrated in FIG. 3 and discussed previously. However, steps 420 and 425 should by no means be limited to performing the same functionality as step 340.

The method 400, at step 435, may comprise processing the second display driver signal to generate (or determine) video information of the second video image. Step 435 may, for example, share various aspects with step 420 discussed previously. However, step 435 should by no means be limited to performing the same functionality as step 420.

As mentioned previously, the second display driver signal corresponds to a second video image. Generally, the second display driver signal may, for example, comprise a signal for driving a display where the entire screen is dedicated to the second video image. Step 435 may, for example, comprise detecting digital (or analog) video information in the second display driver signal. Step 435 may generally comprise generating (or determining) video information in the second display driver signal corresponding to the second video image. Accordingly, the scope of various aspects of the present invention should not be limited by characteristics of particular data (or information) detection techniques or processing.

The method, at step 440, may comprise processing the second video image information determined at step 435 to generate video information of a second display window. Step 440 may, for example, share various aspects with step 425 discussed previously. However, step 440 should by no means be limited to performing the same functionality as step 425.

For example, step 440 may comprise transforming the second video image information to fit spatial characteristics of the second display window. For example, step 440 may comprise performing spatial transformation processing of the second video image information. Such spatial transformation processing may comprise, for example, image data sub-sampling or interpolating. Such spatial transformation processing may comprise, for example, image translation processing and/or processing image information using general or custom transformation matrix processing.

In general, step 440 may comprise processing the second video image information to generate video information of a second display window corresponding to the second video image. Accordingly, the scope of various aspects of the present invention should not be limited by characteristics of particular video signal or video data transformation processes.

Steps 435 and 440 may, for example share various aspects with step 350 of the method 300 illustrated in FIG. 3 and discussed previously. However, steps 435 and 440 should by no means be limited to performing the same functionality as step 350.

The method, at step 450, may comprise receiving a window control signal. Such a window control signal may, for example, be internally generated by the display system (e.g., by default or in response to various conditions) or may be externally generated (e.g., by a user using a window control device). In an exemplary scenario, the first time a display system generates a display window corresponding to a video image, the display window may have default characteristics. Then a user may, for example, command the display system to modify the display window characteristics using a control device.

A window control signal may, for example, comprise information controlling various aspects of one or more display windows. For example, a window control signal may comprise information of window type, window size, window placement, window maximization/minimization status, window tiling, window priority, etc. Steps 425 and 440 may, for example, utilize information in a window control signal to determine various aspects of the first and second display windows. Step 460, discussed below, may also utilize information provided in such a window control signal.

In general, step 450 may comprise receiving a window control signal. Accordingly, the scope of various aspects of the present invention should not be limited by characteristics of a particular window control signal or source thereof.

The method 400, at step 460, may comprise combining information for the first and second display window (or n display windows) into a composite video display image, where the video display image comprises information of at least a portion of the first display window (and/or related graphics) and information of at least a portion of the second display window (and/or related graphics). For example, step 460 may comprise combining at least a portion of the first display window information generated at step 425 with at least a portion of the second display window information generated at step 440 into information of a video display image comprising at least a portion of the first display window and at least a portion of the second display window. Step 460 may, for example, comprise placing display image information in a video buffer.

Step 460 may, for example, comprise multiplexing video information (or signals) in the digital domain or multiplexing various window signals in the analog domain. Accordingly, the scope of various aspects of the present invention should not be limited by characteristics of particular processing or multiplexing techniques that may be utilized to combine window images (information and/or signals) into a composite video display image comprising aspects of the various window images.

Step 460 may, for example, further comprise incorporating graphics information into the video display image information. Such graphics information may, for example, comprise various graphics information related to the first and second display windows. Such graphics information may, for example, comprise window border information, cursor information, scroll bar information, menu information, icon information, etc. For example, in an exemplary scenario, the first and second display windows may be associated with respective icons, and step 460 may comprise incorporating information of the respective icons in addition to (or in place of) information of the first and second display windows in the video display image information. Step 460 may, for example, comprise incorporating graphics information, textual information, and other information into the video display image information. Accordingly, the scope of various aspects of the present invention should not be limited by characteristics of particular information (graphics or otherwise) additional to window video information that may be incorporated into the video display image information.

The method 400, at step 470, may comprise generating an output display driver signal representative of the video display image information formed at step 460. Such an output display driver signal may, for example, comprise a display driver signal in accordance with any of a variety of standard or proprietary protocols. For example, the output display driver signal may comprise various characteristics of the video driver signals received at steps 415 and 430 discussed previously.

Steps 460 and 470 may, for example, share various aspects with step 360 of the method 300 illustrated in FIG. 3 and discussed previously. However, steps 460 and 470 should by no means be limited to performing the same functionality as step 360.

The method 400, at step 480, may comprise driving one or more output displays with the output display driver signal generated at step 470. Such an output display may, for example, comprise a standard video display. Such an output display may, for example, comprise a single screen or multi-screen display. Such an output display may, for example, share various aspects of the display devices 180, 280 discussed previously with regard to the exemplary systems 100, 200 illustrated in FIGS. 1-2 and discussed previously. Such an output display may comprise any of large number of display characteristics, and accordingly, the scope of various aspects of the present invention should not be limited by characteristics of a particular display or way of displaying video information.

The method 400, at step 490, may comprise performing further processing. For example, step 490 may comprise repeating various steps of the method 400 until a user directs processing to change or halt. Step 490 may, for example, comprise modifying aspects of an output display image in response to various changing conditions and circumstances.

In summary, aspects of the present invention provide a system and method for providing access to a video display for multiple devices. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to any particular embodiment disclosed, but that the invention will include all embodiments falling within the scope of the appended claims.

What is claimed is:

1. A video display system, comprising:
   a first and second display driver interface operable to receive a first and second video display driver signal from a first and second device, respectively; and
   at least one module, communicatively coupled to the first and second display driver interface, wherein the at least one module is operable to, at least:
   receive the first and second video display driver signal from the first and second display driver interface, respectively;
   generate a video signal corresponding to the first and second video display driver signal, the video signal comprising information of first and second display windows; and
   change dimensions of the first and second display windows by sub-sampling the video signal.

2. The system of claim 1, wherein the at least one module comprises a window multiplexer module that operates to output a signal comprising information of both the first display window and the second display window.

3. The system of claim 1, wherein the first display driver interface comprises a composite video input.

4. The system of claim 1, wherein the first display driver interface comprises a component video input.

5. The system of claim 1, wherein the first display driver interface comprises an input compatible with a computer graphics card output.

6. The system of claim 1, wherein the first display driver interface and the second display driver interface each comprise a respective wireless interface capable of receiving a respective wireless video display driver signal.

7. The system of claim 1, wherein the at least one module comprises a control module operable to receive one or more window control signals from a plurality of users and determine dimensions of the first and second display windows based, at least in part, on the one or more window control signals.

8. The system of claim 1, wherein the at least one module comprises:
   a first and second sub-module operable to receive the first and second video display driver signal and transform the first and second video display driver signal to a first and second window signal, respectively; and
   a third sub-module operable to combine the first and second window signal into an output video signal.

9. The system of claim 1, wherein the at least one module comprises:
   a first and second sub-module operable to receive the first and second video display driver signal and convert the first and second video display driver signal into digital information of a first and second display window, respectively; and a third sub-module operable to combine the digital information of a first and second display window into digital information of a display image, wherein the display image comprises at least a portion of the information of the first and second display window.

10. The system of claim 1, further comprising a graphics generator operable to generate first and second graphics information associated with the first and second display window, respectively, where the information of the first and second display window comprises the first and second graphics information, respectively.

11. The system of claim 1, wherein the output display driver, the first display driver interface, the second display driver interface, and the at least one module are integrated in a single integrated circuit.

12. The system of claim 1, comprising a remote control interface operable to receive, from a remote control, window control information comprising information of window spatial characteristics, wherein the at least one module operates to receive, via the remote control interface, user input information comprising window dimension information for the first and second display windows, and to generate a video signal based, at least in part, on the received user input.

13. The system of claim 1, comprising a remote control interface operable to receive, from a remote control, window control information comprising information of window spatial characteristics, wherein the at least one module operates to receive, via the remote control interface, user input information comprising window placement information for the first and second display windows, and to generate a video signal based, at least in part, on the received user input.

14. The system of claim 1, comprising a remote control interface operable to receive, from a remote control, window control information comprising information of window spatial characteristics, wherein the at least one module operates to receive, via the remote control interface, user input information defining window layering characteristics for the first and second display windows, and to generate a video signal based, at least in part, on the received user input.

15. The system of claim 1, comprising a remote control interface operable to receive, from a remote control, window control information comprising information of dimension of the first and second display windows.

16. The system of claim 1, wherein the information of the second display window is layered with respect to the first display window.

17. The system of claim 1, wherein the at least one module is further operable to, at least: change dimensions of the first and second display windows by interpolating.

18. The system of claim 1, wherein the at least one module is further operable to, at least: change dimensions of the first and second display windows by matrix processing.

19. A method, comprising:
receiving, via a first and second display driver interface, a first and second display driver signal from a first and second video source device, respectively;
receiving, via a remote control interface, window control information from a remote control, where the window control information comprises information of window spatial characteristics; and
processing the first display driver signal to generate video information of a first display window;
processing the second display driver signal to generate video information of a second display window;
changing dimensions of the first and second display windows by sub-sampling video information of the first and second display windows.

20. The method of claim 19, wherein generating an output display driver signal comprises utilizing a window multiplexer to multiplex information of the first display window and information of the second display window and outputting a signal comprising the multiplexed information.

21. The method of claim 20, comprising communicating the output display driver signal to one or more video display devices.

22. The method of claim 20, wherein generating an output display driver signal comprises storing at least a portion of the video information of the first display window in a display buffer, and storing at least a portion of the video information of the second display window in the display buffer.

23. The method of claim 19, wherein the receiving a first display driver signal comprises receiving a composite video signal, and the processing the first display driver signal comprises transforming the composite video signal into video information of the first display window.

24. The method of claim 19, wherein the receiving a first display driver signal comprises receiving a component video signal, and the processing the first display driver signal comprises transforming the component video signal into video information of the first display window.

25. The method of claim 19, wherein the receiving a first display driver signal comprises receiving a video signal output from a graphics card, and the processing the first display driver signal comprises transforming the video signal output from the graphics card into video information of the first display window.

26. The method of claim 19, wherein the receiving a first display driver signal comprises receiving a wireless signal comprising the first display driver signal and the receiving a second display driver signal comprises receiving a wireless signal comprising the second display driver signal.

27. The method of claim 19, comprising receiving one or more window control signals from a plurality of remote control devices, and wherein processing the first and second display driver signals to generate video information of the first and second display windows comprises determining a spatial characteristic of the first and second display windows based, at least in part, on the one or more window control signals.

28. The method of claim 19, comprising receiving window control information from a remote control device via a window control.

29. The method of claim 19, wherein:
the processing the first and second display driver signal to generate video information of a first and second display window, respectively, comprises:
determining first and second video information from the first and second display driver signal, respectively;
performing first and second image size transformation processing on the first and second video information to fit the first and second video image to the first and second display window, respectively; and
generating video information of the first and second display window based at least in part on the results of the first and second image size transformation processing, respectively.

30. The method of claim 19, wherein the at least a portion of video information of the first display window comprises graphics information associated with the first display window, and at least a portion of video information of the second display window comprises graphics information associated with the second display window.

31. The method of claim 19, comprising receiving, via the remote control interface, user input information comprising window dimension information for the first and second display windows, and wherein generating an output display driver signal comprises generating the output display driver signal based, at least in part, on the received user input.

32. The method of claim 19, comprising receiving, via the remote control interface, user input information comprising window placement information for the first and second display windows, and wherein generating an output display driver signal comprises generating the output display driver signal based, at least in part, on the received user input.

33. The method of claim 19, comprising receiving, via the remote control interface, user input information defining window layering characteristics for the first and second display windows, and wherein generating an output display driver signal comprises generating the output display driver signal based, at least in part, on the received user input.

34. The method of claim 19, comprising generating an output display driver signal comprising at least a portion of the video information of the first and second display window.

35. A method comprising:
receiving, via a display driver interface, a display driver signal from a video source device, the display driver signal corresponding to a video image;
processing the display driver signal to generate video information of a display window; and
changing a dimension of the display window by sub-sampling the video information of the display window.

36. The method of claim 35, where the dimension of the display window are definable by a remote control via a remote control interface.

37. The method of claim 36, comprising receiving, via the remote control interface, window control information from the remote control.

38. The method of claim 37, wherein in the sub-sampling of the video information of the display window is based on the window control information.

* * * * *